Nov. 15, 1960    W. E. CHEELEY    2,960,218
EXPENDABLE SHIPPING CONTAINER AND BAKING PAN
Filed June 10, 1957    2 Sheets-Sheet 1
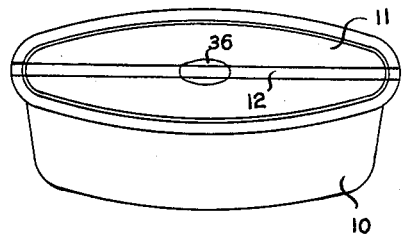
Fig. 1
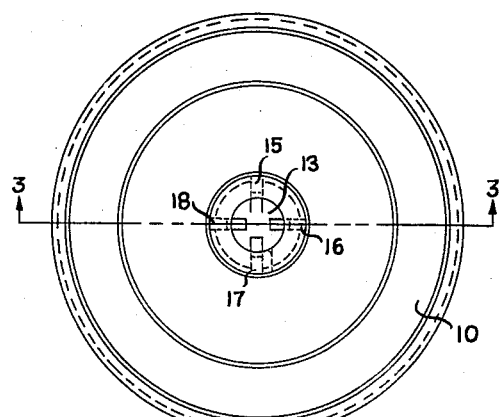
Fig. 2
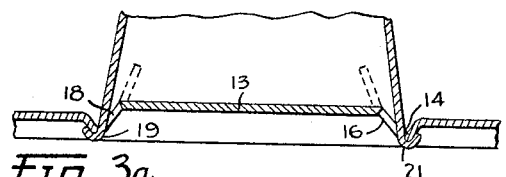
Fig. 3a
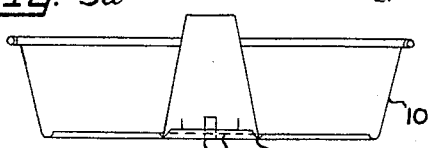
Fig. 3
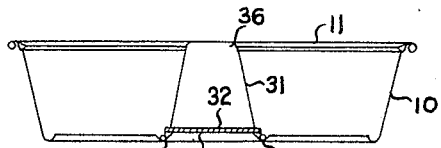
Fig. 4
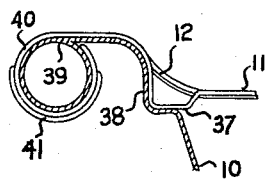
Fig. 5a
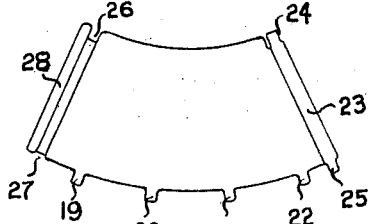
Fig. 6
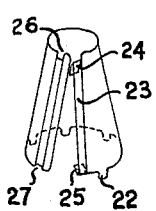
Fig. 5b
Fig. 7
INVENTOR
WILLIAM E. CHEELEY
BY Glenn & Jackson
ATTORNEYS Nov. 15, 1960     W. E. CHEELEY     2,960,218
EXPENDABLE SHIPPING CONTAINER AND BAKING PAN
Filed June 10, 1957     2 Sheets-Sheet 2

INVENTOR
WILLIAM E. CHEELEY
BY Glenn & Jackson
ATTORNEYS

United States Patent Office 2,960,218
Patented Nov. 15, 1960

2,960,218

EXPENDABLE SHIPPING CONTAINER AND BAKING PAN

William E. Cheeley, Louisville, Ky., assignor to Reynolds Metals Company, Richmond, Va., a corporation of Delaware Filed June 10, 1957, Ser. No. 664,854

3 Claims. (Cl. 206—47)

This invention relates to an improved multi-purpose article adapted initially to serve as a shipping container, then, by simple manipulation, to serve as a baking utensil and finally, after having served these purposes, to be readily discarded without the necessity for cleaning and reuse. In particular, it relates to an article which permits a simplified and inexpensive marketing of cake ingredients and a simplified and inexpensive baking of the cake by the housewife or other baker.

An object of the invention is to provide an improved shipping container adapted for ready conversion to a baking utensil.

Another object is to provide a sealed shipping container adapted jointly to contain all of the essential purchased ingredients for a cake in proper proportions and to be converted into a utensil for baking those ingredients.

Another object is to provide an improved inexpensive baking utensil formed from a shipping container and suitable for discarding after a single use.

A further object is to provide an improved, inexpensive and easily packaged heat-conducting member for a baking pan in which foodstuff may be baked with a cored configuration.

Still a further object is to provide a combined shipping container and baking utensil which may be manufactured and assembled on automatic high-speed machinery.

Other objects and advantages of my invention will become apparent as the description proceeds and when considered in conjunction with the accompanying drawings in which:

Fig. 1 is a perspective view of the shipping container;

Fig. 2 is a plan view of the baking utensil formed from the shipping container and with one form of heat-conducting member in place;

Fig. 3 is a view taken on line 3—3 of Fig. 2;

Fig. 3a is a detail view taken along line 3—3 of Fig. 2 to a larger scale and showing the engagement of the heat-conducting member with the ledge and the groove;

Fig. 4 is a view similar to Fig. 3, but with a second form of heat-conducting member shown in shipping position and with the cover of the shipping container still in place;

Fig. 5a is a detail of one edge of the cover of the shipping container shown in place on the article as shipped, and to a much larger scale;

Fig. 5b is similar to Fig. 5a but with a different cover arrangement.

Fig. 6 is a developed view of one form of heat-conducting member;

Fig. 7 is a perspective view, to a smaller scale, of the member of Fig. 6 and when partially assembled;

Figure 8:
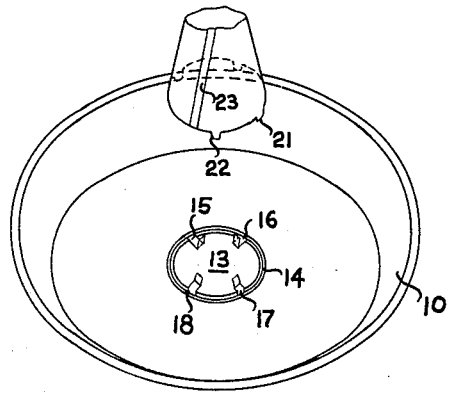
Fig. 8 is a perspective view of the parts of the baking utensil during assembly.

In accordance with my invention, a metallic pan is provided with an easily removable cover sealed thereto at the point of assembly and containing sealed containers of cake ingredients, or the like, and a heat-conducting member separate from the pan. This assembly serves as a shipping container and as a separate article of merchandise which is marketed as a unit. The purchaser of the unit then opens the shipping container, mixes the cake ingredients in a separate vessel, inserts the heat-conducting member into a retaining groove or into a groove and readily formed apertures in the pan to form the assembled baking utensil, pours the mixed cake ingredients into the formed utensil, and proceeds with the baking operation. As a significant feature, the work of the baker is greatly simplified since only a single extra vessel has been used which will require cleaning; no extra inventory of cake ingredients is needed, since the shipping container contains the amount needed for the single cake; and the baking utensil, as well as the cover of the shipping container, are expendible.

Referring now to Fig. 1, the shipping package may conveniently comprise a thin aluminum pan 10 having any desired capacity and having an outwardly inclined wall diverging from the pan bottom. The curled upper periphery of that wall has attached in sealed relation thereto a circular aluminum cover 11 having a tear strip 12, such as disclosed in my U.S. Patent 2,777,601, extending thereacross. As an example of a preferred use of the invention, the shipping container and baking utensil are described herein in relation to their use in preparing angel food cakes, although the invention in its broader aspects is not limited to any type if cake and, on the contrary, may be used in connection with the cooking of any other comestible wherein a heat-conducting member for the utensil is preferred in order to produce a baked foodstuff having a cored configuration.

However, when used for angle food cakes it will be understood that the cake ingredients in their proper proportions are contained in one or more hermetically sealed bags (not shown) in accordance with known practices in ready-mix cake making and that these bags are deposited in the pan 10 prior to fastening cover 11 thereon. Provision also is made for the storage within the container of a separate heat conducting member for use in the later baking of the cake. As is known, such a member not only assists in improving the baking operation, but also assists in removing the baked cake from the pan and, moreover, when made of a suitable length, may serve to support the cake in inverted position during the cooling of the cake. When employing a member of sufficient length to support the inverted pan, I store within the container a flat sheet, or blank, of thin material, such as aluminum, as shown in developed form in Fig. 6 and which may readily be formed into a hollow truncated cone, as will later appear. When employing a heat-conducting member originally containing a cake ingredient, such as the egg component, I store within the container a truncated conically-shaped cup, such as shown in Fig. 4. In either event, the cover 11 is adapted to be tightly sealed to pan 10 after the heat conducting member is stored in the container.

Referring now to Figs. 2, 3 and 4, pan 10 is shown with a centrally disposed, upwardly directed, circular ledge 13 in its bottom portion and with this ledge surrounded by a retaining groove 14 on the inside of the pan. From its periphery near the groove 14, the ledge has a plurality of radially and inwardly directed, scored sections 15, 16, 17 and 18 which may readily be punctured and pulled inwardly to provide a corresponding number of open slots into which heat may pass during the baking operation. The flattened tube blank shown in Fig. 6 is provided at its base with a plurality of tabs 19, 20, 21 and 22 for engagement in the open slots at the bottom of groove 14 when the baking pan is assembled, as seen in Fig. 3a. In addition, the blank contains at one side extremity, an overlapping strip 23 having tabs 24 and 25 adapted to engage in recesses 26 and 27 disposed inwardly of the strip 28 at the other side extremity of the blank. The partially formed heat conducting tube is best shown in Fig. 7. Preferably, the dimensions of the blank are such that, when assembled by the baker into the baking pan shown in Fig. 3, the upper end of the formed tube will project above the top of the pan walls and with the lower end of the tube securely seated in groove 14 around the ledge portion of the pan bottom. Fig. 8 illustrates the detached relation of the formed tube and the apertured pan bottom during the assembly procedure. The user, after assembling the heat conducting tube and opening the slots in the pan bottom, simply engages the tabs of the tube within those slots and bends the tabs outwardly. The bottom of the tube engages in groove 14 and prevents any material, later poured into the assembled pan, from leaking into the slots.

Figure 9:
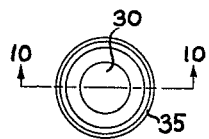
Fig. 9 is a plan view of a second form of heat-conducting member.
Figure 10:
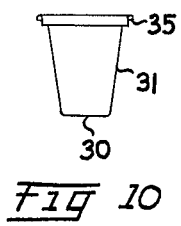
Fig. 10 is a view on line 10—10 of Fig. 9.
Figure 11:
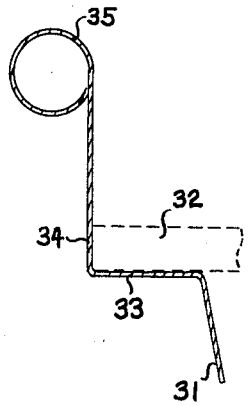
Fig. 11 is a detail of one edge of the member of Figs. 9 and 10, and to a large scale.

When it is preferred to package a particular ingredient of the cake separately, the cup shaped heat conducting member shown in Figs. 9 and 10 may be employed. This member may be formed of thin aluminum and comprise a closed portion 30, a sloping wall 31, and an open portion and may be adapted to rest in inverted position as shown in Fig. 4. To prevent spillage of the contents of the cup, a detachable cover 32 as seen in Fig. 4 is securely wedged upon the flat wall surfaces 33 and 34 near the open portion of the cup as shown by dotted lines in the large scale view of Fig. 11. The flat wall surface 34 terminates in a curled edge 35 spaced sufficiently far from the cover 32 to enable that cover to clear the ledge 13 of the pan bottom and to permit the curled edge to engage in groove 14 in the pan bottom. The cover 32 may be of any suitable material, such as a sterilized cardboard. For providing additional securing of the separate cup in place during shipping, the cover 11 may be provided with an outwardly directed recess 36 as seen in Figs. 1 and 4 to engage with the portion 30 of the cup.

When using the cup shaped member as the heat conducting means, the cup is first emptied of its contents, the cover 32 is discarded, the slots in the bottom of the pan are opened, and the cup member is reinserted in groove 14, whereupon heat during the baking operation enters the slots and fills the interior of the inverted cup member due to the communication of the interior of the cup with the exterior of the pan bottom through those slots.

It will be understood that cover 11 is applied to pan 10 by conventional high speed packaging machinery after the cake ingredients and the selected type of heat conducting member are already installed in the pan 10. The cover, as described in the aforementioned patent, provides an efficient seal for the pan and, in addition, the cake ingredients are contained in sealed containers with the result that a sanitary composite article of long shelf-life is produced. As seen in Fig. 5a, the cover 11 preferably has a peripheral channel section 37 which fits closely against a shoulder 38 on the upper edge of pan wall 10 and this wall terminates in a curled edge 39. The cover in turn terminates in a curled edge 40 overlying the reinforcing edge 39 of the pan and the tear strip 12 overlies the respective curled edges and has a readily graspable tab section 41. Fig. 5b shows a different form of cover and curled edge than that of Fig. 5a.

Having thus described my invention, the advantages thereof will be particularly apparent to the ultimate user of the article. A container with all necessary cake ingredients and having a baking capacity for the size of cake desired, may be chosen at a store and no additional ingredients other than a small amount of water is normally needed for preparing the cake. The pan is suitably reinforced by its curled edges and with its generally truncated conical shape is form retaining, even though constructed of a thin aluminum or other material. The heat conducting member is readily attachable to the pan and serves to preserve the cored shape of the baked cake. When the long open tubular heat conducting member is employed, the finished cake may be rested in inverted position for cooling.

Although these and other advantages will be understood from the foregoing description, it will also be apparent that various changes may be made in the form, construction, and arrangement of the structure without departing from the spirit or scope of my invention.

What I claim as new and desire to secure by Letters Patent of the United States is:

1. A metallic shipping container and baking pan comprising in combination, a pan section having a normally imperforate bottom, an outwardly and upwardly inclined side wall diverging from said bottom and having a reinforced upper wall periphery, said bottom including an integrally formed, centrally disposed, circular ledge portion offset upwardly of the lowermost portion of said pan bottom, a circular groove surrounding said ledge portion and extending downwardly therefrom to the bottom of said pan section, a plurality of scored sections spaced from each other in the bottom of said pan section and extending from near the periphery of said groove toward the center of said ledge portion, a truncated conical cup separately contained in said pan and having a circular lower edge portion in engagement with said groove and in surrounding relation to said ledge and to apertures formed in said bottom portion upon perforating of said scored sections thereby jointly to prevent leakage of the baking pan contents through said apertures and to permit heat applied to the bottom of said baking pan to pass freely through said apertures into the interior of said cup, and a cover removably attached to the reinforced upper wall periphery of said pan section, said cover having a recess into which the closed end of said cup is adapted to fit prior to opening of said container.

2. An article as defined in claim 1 wherein said cup includes a removable cover adapted to be interposed between said ledge portion and the interior of said cup during use of the article as a shipping container, and to be removed therefrom during the use of the article as a baking pan.

3. A metallic shipping container and baking pan comprising in combination, a pan section of generally truncated conical form having a normally imperforate bottom, an outwardly and upwardly inclined side wall diverging from said bottom and having a curled upper wall periphery forming a reinforcing pan edge, said bottom including an integrally formed, centrally disposed circular ledge portion offset upwardly of the lowermost portion of said pan bottom, a circular groove surrounding said ledge portion and extending downwardly therefrom to the bottom of said pan section, a plurality of scored sections spaced from each other in the bottom of said pan section and extending from near the periphery of said groove toward the center of said ledge portion, a hollow truncated conical heat-conducting member separately contained in said pan and having a generally circular lower edge portion in engagement with said groove and in surrounding relation to said ledge and to apertures formed in said bottom portion upon perforating of said scored sections thereby jointly to prevent leakage of the baking pan contents through said apertures and to permit heat applied to the bottom of said baking pan to pass freely through said apertures and into the interior of said member, said lower edge of said member including tab portions for extension through said apertures and for bending into engagement with said pan thereby to mount said member firmly upon said pan prior to baking, and a cover removably attached to said reinforcing pan edge prior to opening of said container.

References Cited in the file of this patent

UNITED STATES PATENTS

| | | |
|---|---|---|
| 105,991 | Smith | Aug. 2, 1870 |
| 1,464,290 | Orr | Aug. 7, 1923 |
| 1,727,257 | Stratton et al. | Sept. 3, 1929 |
| 2,039,374 | Young | May 5, 1936 |
| 2,271,921 | Luker | Feb. 3, 1942 |